United States Patent [19]

Diamond

[11] Patent Number: 4,683,773
[45] Date of Patent: Aug. 4, 1987

[54] ROBOTIC DEVICE

[76] Inventor: Gary Diamond, 671 Landfair, #9, Los Angeles, Calif. 90024

[21] Appl. No.: 749,424

[22] Filed: Jun. 27, 1985

[51] Int. Cl.$^4$ .................. G05G 11/00; B25J 1/02; B25J 9/12

[52] U.S. Cl. ................... 74/479; 74/378; 446/383; 901/21; 901/48

[58] Field of Search .............. 74/479, 378; 414/7; 901/21, 28, 29, 25, 48; 254/345; 446/323, 353, 362, 365, 371, 383; 623/24, 59, 60; 180/8.1

[56] References Cited

U.S. PATENT DOCUMENTS

| | | |
|---|---|---|
| 276,785 | 5/1883 | Daso ......................... 254/345 X |
| 1,565,927 | 12/1925 | Green ........................... 74/378 X |
| 1,608,134 | 11/1926 | Michel ......................... 446/365 |
| 3,497,083 | 2/1970 | Anderson ................... 901/28 X |
| 3,631,737 | 1/1972 | Wells ........................... 901/21 X |
| 4,489,826 | 12/1984 | Dubson ....................... 901/25 X |
| 4,494,417 | 1/1985 | Larson et al. ............... 901/21 X |
| 4,522,555 | 6/1985 | Inoue et al. ................. 74/479 X |
| 4,566,843 | 1/1986 | Iwatsuka et al. ............ 901/21 X |
| 4,571,208 | 2/1986 | Saigo et al. ................. 446/353 |

FOREIGN PATENT DOCUMENTS

| | | | |
|---|---|---|---|
| 1500113 | 9/1967 | France ........................ | 414/7 |
| 2134483 | 8/1984 | United Kingdom ....... | 414/7 |
| 676441 | 7/1979 | U.S.S.R. ..................... | 901/28 |
| 814721 | 3/1981 | U.S.S.R. ..................... | 901/21 |
| 1077780 | 3/1984 | U.S.S.R. ..................... | 414/7 |

OTHER PUBLICATIONS

Flexible Column Research Project, 1963, p. 83, from "The Works of Frei Otto", copyright 1972 by the Museum of Modern Art.

Primary Examiner—Allan D. Herrmann

[57] ABSTRACT

A new type of robotic device is disclosed, using several cable trussed compression members in concert. The cable trussed compression members are deformed along the length of their central compression mast, by the lengthening and shortening in concert of all of the cables of each cable trussed compression member, through the use of motors. Weights traveling on tracks, or fluid filled hoses, are used in addition to the deformation of the cable trussed compression members, to change the location of the center of gravity of the entire assembly, thereby enhancing the balancing and stability of the robotic device. Additional known mechanical and electrical devices may be used in conjunction with the several cable trussed compression members.

7 Claims, 3 Drawing Figures

ROBOTIC DEVICE

BACKGROUND OF THE INVENTION

In the prior art of robotics, devices existing which are to perform either precise or great range of movement reaches, have their primary structures generally built of rollers, bearings, gears and the like. These are precision built devices, and their command controls relate to a three dimensional axis environment which is decoded as a location and sent to each joint of a given appendage as controls in the x, y, and z directions. These devices are by the nature of their need to have three axis control in each of the joints, very high technology devices, requiring fine machining, and milling or casting, and they are likewise of a low tolerance nature. Any heavy loads placed upon the joints of such devices tend to cause eccentric stresses upon the joints. The repair of the prior art devices is equally as demanding in technology, and low tolerance. The devices of the prior art in robotics are very complex and sensitive mechanisms.

The balancing capabilities of the devices of the prior art have been treated as specific to a particular task. As such, most devices which have been devised to perform a limited number of tasks, have balancing abilities only adequate to perform those tasks. When the task is changed substantially, the counter.balance devices will also need re-adjusting, and in the prior art this has been treated as a secondary problem requiring retooling or reconfiguring of the entire device. The balance behavior of the prior art objects are only given in relation to the task at hand and have no natural or inherent center of gravity removed from that task, no natural resting balance not dependant on the task, no sense of self or built in center of gravity of preference. They are then slaves of their task and not self seeking in any way.

Devices of the prior art have only a limited ability at locomotion. Many-legged devices exist which move by a rolling gait, radially translating as they go. Other devices have wheels powered by motors and move like a vehicle. Some other devices of the prior art have a stepping-like movement, some even on two legs, but they are very gross in nature and in no way provide for the smooth, graceful bipedal locomotion of man or the quadrapedal movement of other animals. None, for example can easily walk up a flight of stairs, or crawl over rough terrain.

No single device of the prior art used for locomotion and manipulation, can both handle rough terrain and do fine manipulation.

In the prior art, a specific problem, say that of a foot as distinct to the problem of a hand, is treated as a separate design problem, and thereby each new task in which a robotic device is applied, has caused the construction of a new device, substantially different from all previous robotic solutions.

SUMMARY OF THE INVENTION

The primary structures of the present Invention are cable trussed compression members. Other devices utilized in the composition of the present Invention, such as bearings, gears, clutches and rollers and the like, are used as secondary parts of the device disclosed.

cable trussed compression members are very simple mechanisms. The central mast is deflected by the lengthening and shortening of cables which are attached to vertebrae-like bulkheads which are themselves attached to the central compression mast. This use eliminates the need for a segmented device to provide bending as in a digit of a robotic device.

The coded message sent to a digit, therefore is not based directly on a command to direct the digit to a location based on the traditional x,y,and z axes, and subsequently to the movements of the several hinge points of the device according to the prior art, but the desired location is previously decoded into a series of numbers representing cable lengths or rotations of a control plate which can be sent to the motors controlling the device according to the present invention. This substantially simplifies the interface of information to the robotic device as the point of recieving of the critical location information is found before the cable trussed compression member itself.

Therefore using a device according to the present invention relies only on a motor attached to a spool and bevel gear assembly, or a control plate, all of which are located separately from the cable trussed compression member. Therefore there is nothing within a digit according to this present invention which can break down, and nothing anywhere in the device that is of a high technology nature or that has a low allowable tolerance.

The device of the present invention could be built by parts readily available at usual industrial outlets, and could be repaired by a substantially unskilled worker in a home garage. It also therefore, has low maintenance, and because of the particular structure of the device, eccentric loads will not wear down the joints of digits made according to the present invention as there are no movable joints within it, and since loads are carried in the flexible mast and cables, and in the substantially rigid vertebrae.

The increased simplicity of the present invention will make for a device having a smaller number of inventory of unique parts and therefore having less unique moving parts, and therefore less parts which may wear or break down. This inherent simplicity will also make for a high tolerance device which will better resist failure to perform a task The present invention comprises a central compression mast which is made of a springy material such as fibreglass, epoxy or a springy metal. As initially configured the device has a preferred stature and position of all of the components, as in the case of FIG. 1, an upright standing man. This could just as well be horizontal crawling man or other configurations. This configuration is substantially more arbtrary and open and undefined than devices of the prior art as it only serves to generally balance the device, irrespective of any location or particular task. Therefore by using a series of weights integral with the device according to the present invention, cables may be lengthened and shortened, and weights moved to locations within the device to counterbalance the effect of the task or location of the device. When the cables and weights are released, the device according to the present invention self seeks the original balanced position of its original configuration. In this way the present invention may be made to walk, or to perform other tasks, utilizing the springy memory, as the device guides itself back to the original balanced position, when unweighted becoming straight. This method would consist first of a deflection of a cable trussed compression member, then the moving of weights to a desired area, then the unflexing of the cable trussed compression member will allow the device to return as it may, based on the location of the weights which will determine substantially where the Member stays as lastly placed, the unweighted end thereby returning to its original straight configuration.

In the operation of the robotic device as seen in FIG.2, the cables, 11 on stellate wing 999, may be selectively pulled and shortened, thereby deflecting the central mast 8, in the direction of wing 999. Depending upon the cables so selectively pulled, cables located closest to the central mast, when pulled and shortened, will deflect the portion of the mast furthest away from the lengthening and shortening means which may be located at the base of the device. Cables located further out from the central mast when shortened, will deflect the portion of the mast closest to the lengthening and shortening means. Similarly, by the selective shortening or lengthening of the cables 11, in both wings 90 and 99, when pulled simultaneously will cause a resultant vector force to occur which will deflect the central mast in a direction located half way between wings 90 and 99. Similarly, if cables 11 located furthest from the central mast 8 and cables 11 located closest to central mast 8 are simultaneously shortened in one or any two of the three wings shown in FIG. 2, and if simultaneously the cables 11 located in the middle section of the group of radially arranged cables 11 in either the adjacent two wings or the remaining one wing then the central mast will be caused to deflect in an s-curve or a snake-like manner. The weighted means FIG. 2, #19,#20-#21, may be moved to a location along the length of the device in order to counter balance the effect of a task or to balance the overall device by changing its center of gravity. If desired, certain movements of the device can be programmed into a computer which can in turn be used to operate servos which will selectively pull the cables 11, or move the control plate 16. By such programming the device can be operated to travel to various predetermined locations to perform various work functions.

This self-balancing behavior considerably frees the device from constraints of location, and the performance of a particular task, and thus makes the device more able to locomote and perform tasks in a varied environment. Configuration of the present invention is much less specific than in devices of the prior art, making it more adaptable to varied tasks and locations. The present invention can therefore both walk up a flight of stairs and crawl over rough terrain. It can step precisely and simultaneouly do other tasks utilizing other cable trussed compression members as required. A generic device is disclosed in the present invention, which can however do specific tasks.

The limited inventory of the unique parts of the present invention provides that a foot-like appendage will be made of the same members as that of a hand-like appendage, though scaled differently, namely cable trussed compression members, simplifying the present invention over the prior art.

DETAILED DESCRIPTION OF THE INVENTION

The present invention comprises a family of robotic devices, each of which has certain basic advantages over robotic devices previously known. Previous devices are complex in nature, and their parts are produced to a required low tolerance in sophisticated factories, and a substantial number of their parts are specifically designed and built for the particular device and indeed, as the task of the device changes, some of the parts may also be required to change The device according to the present invention is extremely simple in nature and is comprised of parts all readily available from industrial catalogs existing. It has a smaller total number of unique parts, and requires substantially less specific milling or tooling or casting to create the device according to the present invention, than do devices of the prior art.

It is also, therefore more easily repaired by the end user, and is less apt to wear out or break down.

The present invention is made primarily from at least two cable trussed compression members, meeting at a junction device of anchorage. The cable trussed compression members have a central compression mast which is made from a flexible springy material, and which may be a straight or curved mast. The cables of the device are controlled in order to deflect the mast towards a task. Weights within the device are moved about and when completed the mast will return to its initial shape.

When at least two cable trussed compression members are joined at a vertex and integrated with other mechanical and electrical devices, a robotic device is created which is superior to those devices of the prior art.

A specific illustration of such a robotic device can be made with reference to FIGS. 1 through 4.

Figure 1:
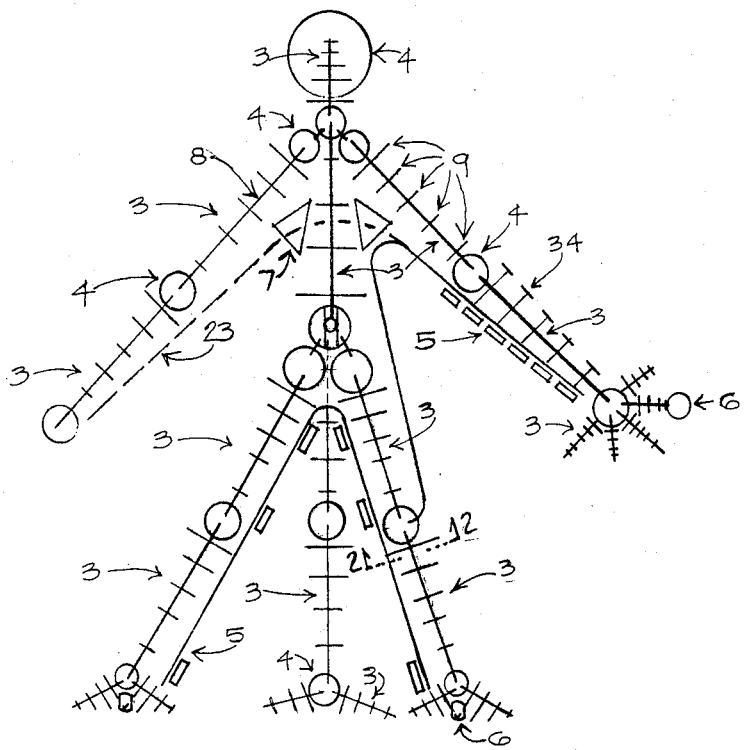
FIG. 1 is an elevation view of a robotic device in the configuration of a substantially human form.

One embodiment of a device according to the present invention is shown in FIG. 1.

This device is made from a combination of cable trussed compression members 3, at least two of which are joined at a terminus device 4. Several of these assemblies are joined at the ends of the cable trussed compression members, to form a robotic device. Weights on tracks 5, are located adjacent to the cable trussed compression members, and are moved to different locations within the present device to change the center of gravity of the device and to both help deflect and counterbalance the cable trussed compression members.

Other devices 6, such as wheels or rollers or pivots or other specific to task devices may be located at the ends of the cable trussed compression members, to further enhance a specific performance of a task. The terminus device 4, may contain other mechanical and electrical devices such as gears motors, clutches, balls and sockets or other known devices to enhance the performance of the disclosed device.

Areas 7, not occupied by cable trussed compression members, weights, or terminus devices, may contain other devices such as power sources, additional microcircuit program centers, or other needed devices.

Figure 2:
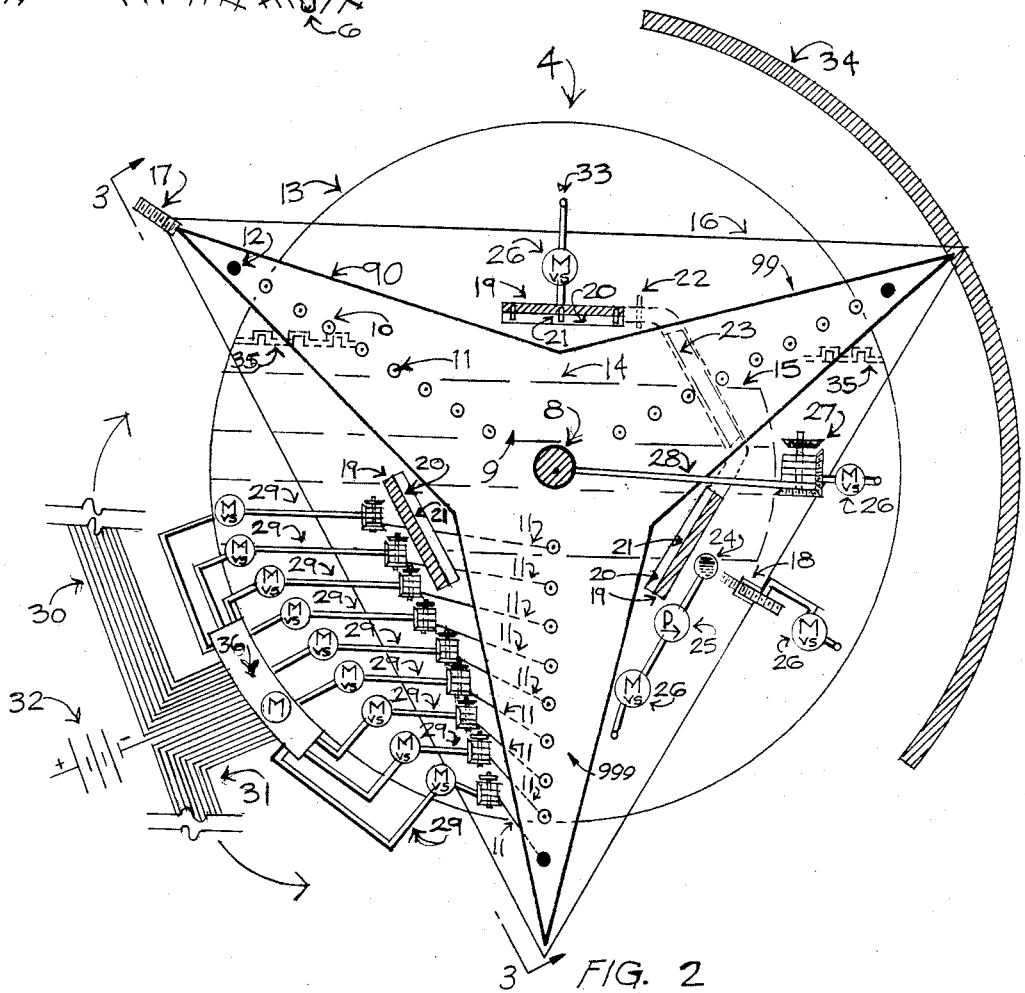
FIG. 2 is a cross section taken along line 2—2 in FIG. 1.

FIG. 2 is a typical cross sectional view taken through a mast 8, of a cable trussed compression member according to the present invention, looking towards a terminus device 4.

Figure 3:
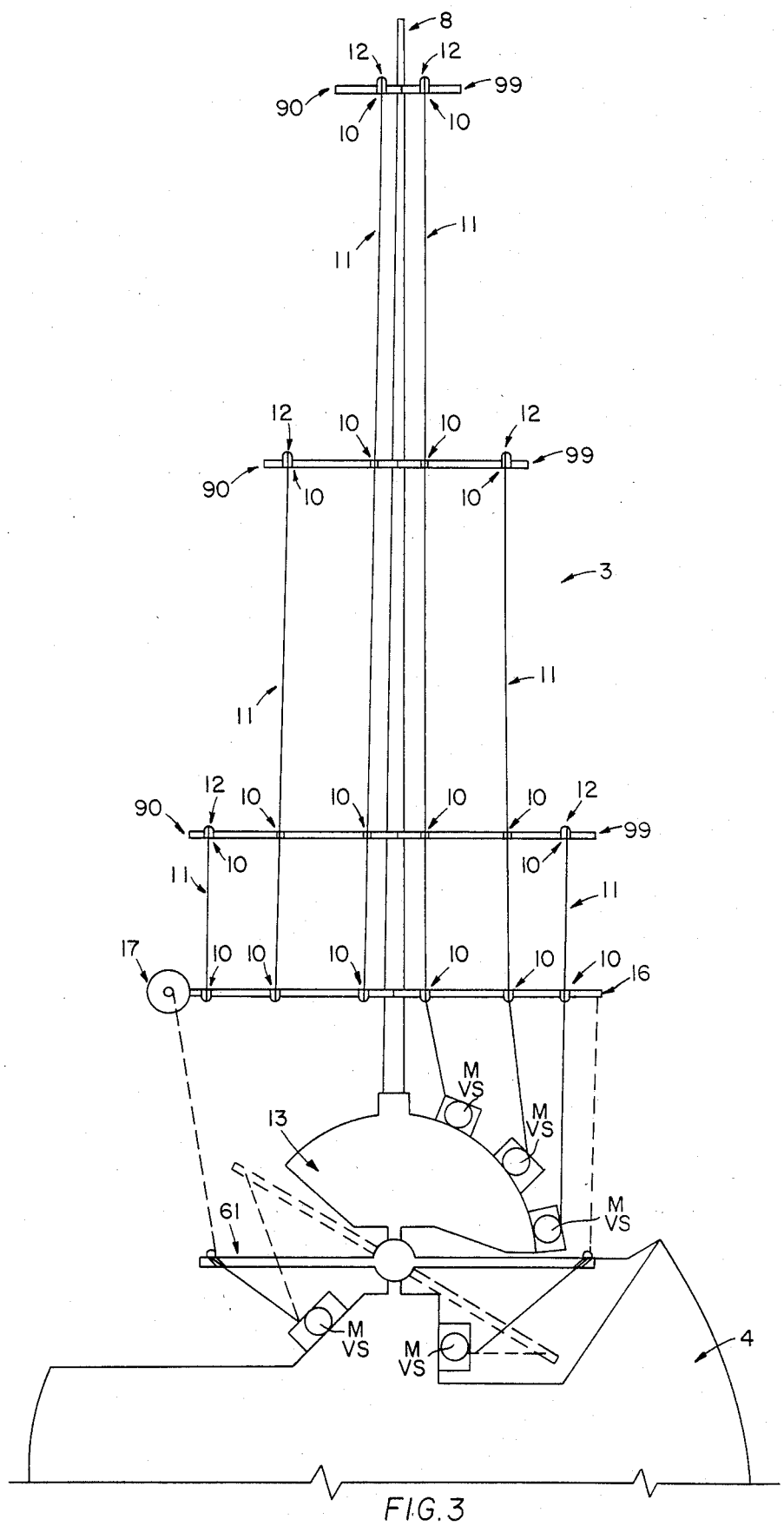
FIG. 3 is a cross section taken along line 3—3 in FIG. 2.

FIG. 3 is a cross sectional view taken along the line 3—3 in FIG. 2, showing the relationships of the primary features of the invention to each other.

The vertebrae or "bulkheads" 9, of the cable trussed compression member has three wings, or "stellate regions" 90,99,999, and each wing contains holes 10, through which the cables 11, may pass. Some cables are capped 12, and terminate at given vertebrae. The terminus device 4, has a base 13, which is used for anchorage of the cable trussed compression member and other parts of the device.

The cable trussed compression member may bend about its end or translate along a clutched pathway 15. The base of the terminus device 13, may be divided into sections which are geared or otherwise controlled 35, thereby providing for the rotation of different sections containing different cable trussed compression members, in relation to each other.

A control plate 61, may be located at the terminus device, and may be manipulated through a series of gears or other devices located at the ends 17, or along edges 18, of the control plate 16. The control plate 16, may be connected to a ball and socket or other device, and may have the termination of the cable ends of the cable trussed compression member attached to it and thereby also control the deflection of the cable trusses compression member.

A weighted means 19, and a track means 20, used to transport the weights, and a hitching device 21, are used to change the center of gravity of the whole device as well as balance it. A gate interlock 22, is used to allow or restrain the movement of the weights through a path 23, between areas of the cable trussed compression member and the entire robotic device. The hitching device 21, is used to allow for both the close packing of weights and to alter its configuration and spread out the weights at a greater distance over the track means.

A fluid filled hose 24, and a pump means 25, is used to move the fluid to different areas, balancing and weighting variably the robotic device of the present invention.

Motors 26, which may be variable speed motors, are used throughout to control the various cable and other devices.

A spool device 27, is composed of a beveled-gear arrangement and an additional parallel beveled gear, and this device is used to lengthen or shorten the cables 11, which are wound about the spool 27. The two parallel gears are alternately moved into contact with the adjacent gear which is turned by motor 26. Thus when one gear is engaged the result will be to shorten the cable, and when the other parallel gear is engaged the result will be to lengthen the cable by unwinding it about the spools axle, which axle is attached to both parallel gears. This means of an alternating pair from three bevel gears with a spool integral is a distinct device from the prior art of simple machines.

The cable 28, is attached to the main compression mast and may directly deflect it by the spool and gears means 27, previously described.

The complete assembly 29, of a motor 26, to spool 27, to cable 11, device, is located at each of the cables 11, at their ends nearest the terminus device 4, In the preferred embodiment twenty-seven of these complete assemblies 29 would be required but more or less could be used as desired.

Nine of the assemblies 29 are shown. The other assemblies 29, in the preferred embodiment, nine occurrences of which, here called 30, and an additional nine occurrences, here called 31, are routed to the other two wings of the vertebrae 9.

Power sources may be battery 32, or external electric sources 33.

Armoring plates 34, may be used to protect the device or as an anchorage for additional technical devices or cable trussed compression members.

Microcircuits containing task and operational programs 36, are located on the terminus device 4, or at other areas in the device 7.

While discussion of the preferred embodiment has been made with reference to FIGS. 1 through 3, the Figures are for purposes of illustration only and should not be interpreted as limitations upon the invention. It should be understood that various changes in material and construction may be made to the construction of the device disclosed herein, by one of ordinary skill in the art, without departing from the spirit and scope of the invention which is intended to be defined and limited solely by the appended claims.

What is claimed is:

1. A robotic device formed of at least one cable trussed compression member the device comprising,
    at least one continuous non-segmented flexible mast,
    said at least one mast being joined to a base,
    at least three substantially planar bulkheads, attached to said mast at spaced intervals thereby not in contact,
    at least three radially arranged cable groups passing through holes in said bulkhead each group having at least one cable end terminating along a radial in each of said at least three bulkheads thereby comprising at least nine cables,
    said cable groups having their remaining ends terminated in a lengthening and shortening control means,
    a means to coordinate said control means,
    a weighted means being movable along the length of said mast, thereby changing the center of gravity of said device,
    a means to control said weighted means.

2. The device according to claim 1 in which said at least three bulkheads and said central mast diminish in size from one end of said mast.

3. The device according to claim 1 in which said lengthening and shortening control means is joined to said base.

4. The device according to claim 1 in which said control means is a substantially planar member which is itself controlled by a motor or other mechanical device.

5. The device according to claim 1 in which said control means is a motor or other mechanical device.

6. A robotic device comprised of at least two devices according to claim 1 joined together.

7. The device according to claim 1 in which each of said bulkheads are comprised of at least three stellate, wing-like regions,
    said wing regions having the said cable groups located therein.

* * * * *

UNITED STATES PATENT AND TRADEMARK OFFICE
CERTIFICATE OF CORRECTION

PATENT NO.  : 4,683,773
DATED       : August 4, 1987
INVENTOR(S) : Gary Diamond

It is certified that error appears in the above-identified patent and that said Letters Patent is hereby corrected as shown below:

Column 1, line 64, change "cable" to --Cable--

Column 2, line 50, change "arbtrary" to --arbitrary--

Column 4, line 39, change "4" to --3--.

Signed and Sealed this

Thirty-first Day of May, 1988

*Attest:*

DONALD J. QUIGG

*Attesting Officer*    Commissioner of Patents and Trademarks